United States Patent
Morimoto et al.

(10) Patent No.: US 6,369,584 B1
(45) Date of Patent: Apr. 9, 2002

(54) SIGNAL CORRECTION APPARATUS AND SIGNAL CORRECTION METHOD

(75) Inventors: Naohisa Morimoto, Aichi; Ichiro Maki, Kanagawa; Masahiro Takada, Aichi, all of (JP)

(73) Assignees: Matsushita Electric Industrial Co., Ltd., Osaka; Toyota Jidosha Kabushiki Kaisha, Aichi, both of (JP)

( * ) Notice: Subject to any disclaimer, the term of this patent is extended or adjusted under 35 U.S.C. 154(b) by 0 days.

(21) Appl. No.: 09/551,502

(22) Filed: Apr. 17, 2000

(30) Foreign Application Priority Data

Apr. 15, 1999 (JP) .............................. 11-108661

(51) Int. Cl.[7] .............................................. G01R 27/02
(52) U.S. Cl. .................. 324/607; 324/76.13; 361/93.2; 361/93.9
(58) Field of Search .............................. 324/76.13, 111, 324/127, 607, 130, 132; 360/53; 369/44.28; 361/93.2, 93.9

(56) References Cited

U.S. PATENT DOCUMENTS

| 4,023,016 A | * | 5/1977 | Staley |
| 4,890,056 A | * | 12/1989 | Peters |
| 5,121,051 A | * | 6/1992 | Steinbrecher |
| 5,751,284 A | * | 5/1998 | Suptitz |
| 5,815,334 A | * | 9/1998 | Chang |
| 5,878,006 A | * | 3/1999 | Jung |

FOREIGN PATENT DOCUMENTS

| DE | 3844333 | 7/1990 |

\* cited by examiner

Primary Examiner—Safet Metjahic
Assistant Examiner—Trung Nguyen
(74) Attorney, Agent, or Firm—Ratner & Prestia (57) ABSTRACT

A signal correction apparatus includes: a measurement signal generator for generating a measurement signal; a reference signal generator for generating a reference signal; a signal processing section for processing the measurement signal and the reference signal; a signal measurement section for measuring at a first time the reference signal having been processed by the signal processing section, measuring at a second time the reference signal having been processed by the signal processing section, and thereafter measuring the measurement signal having been processed by the signal processing section; and a correction section for performing a correction on the measurement signal having been processed by the signal processing section and measured by the signal measurement section, based on a change from the reference signal having been processed by the signal processing section and measured at the first time to the reference signal having been processed by the signal processing section and measured at the second time.

12 Claims, 6 Drawing Sheets

SIGNAL CORRECTION APPARATUS AND SIGNAL CORRECTION METHOD

BACKGROUND OF THE INVENTION

1. Field of the Invention

The present invention relates to an apparatus and a method for signal correction, for correcting an output signal from a signal processing section which processes a measurement signal output from a measurement signal generator (e.g., a sensor).

2. Description of the Related Art

There is often a need to measure a current flowing in a motor for generating driving forces for a vehicle and a battery for that vehicle. A current sensor is usually used as a measurement signal generator for generating a measurement signal based on which such a current is measured. Since various control processes may be performed on the basis of the output from a current sensor, it is imperative that the output from the current sensor be accurately measured.

However, some circuits which implement signal processing sections for applying various processes to output signals from current sensors are susceptible to effects of the environmental condition changes. For example, circuits which perform gain adjustment or impedance conversion for signals are susceptible to effects of temperature changes. Due to temperature changes, the output signal from such a circuit for processing output signals from current sensors may undergo a so-called drifting. The drifting of the output signal from such a circuit for processing output signals from current sensors may prevent the accurate transfer of output signals from the current sensors. In the case where a charge amount is calculated based on multiplication results of signals from current sensors, such drifting may lead to worse current errors.

SUMMARY OF THE INVENTION

A signal correction apparatus according to the present invention includes: a measurement signal generator for generating a measurement signal; a reference signal generator for generating a reference signal; a signal processing section for processing the measurement signal and the reference signal; a signal measurement section for measuring at a first time the reference signal having been processed by the signal processing section, measuring at a second time the reference signal having been processed by the signal processing section, and thereafter measuring the measurement signal having been processed by the signal processing section; and a correction section for performing a correction on the measurement signal having been processed by the signal processing section and measured by the signal measurement section, based on a change from the reference signal having been processed by the signal processing section and measured at the first time to the reference signal having been processed by the signal processing section and measured at the second time.

Alternatively, a signal correction apparatus according to the present invention includes: a measurement signal generator for generating a measurement signal; a signal processing section for processing the measurement signal; a control section for switching between a first state in which the measurement signal is input from the measurement signal generator to the signal processing section and a second state in which the measurement signal is not input from the measurement signal generator to the signal processing section; a signal measurement section for measuring at a first time a signal output from the signal processing section in the second state as a reference signal, measuring at a second time a signal output from the signal processing section in the second state as the reference signal, and thereafter measuring the measurement signal having been processed by the signal processing section in the first state; and a correction section for performing a correction on the measurement signal having been processed by the signal processing section and measured by the signal measurement section in the first state, based on a change from the reference signal measured at the first time to the reference signal measured at the second time.

In one embodiment of the invention, the correction for the measurement signal having been processed by the signal processing section and measured by the signal measurement section is performed during the operation of a system including the measurement signal generator.

In another embodiment of the invention, the correction for the measurement signal having been processed by the signal processing section and measured by the signal measurement section is performed immediately after activation of a system including the measurement signal generator, wherein the measurement signal and the reference signal measured by the signal measurement section are learned immediately before a halt of the system, wherein the measurement signal learned immediately before the halt of the system is used as the measurement signal having been processed by the signal processing section and measured by the signal measurement section, wherein the reference signal measured by the signal measurement section immediately after activation of the system is used as the reference signal having been processed by the signal processing section and measured by the signal measurement section at the second time, and wherein the reference signal learned immediately before the halt of the system is used as the reference signal having been processed by the signal processing section and measured by the signal measurement section at the first time.

In another aspect of the invention, there is provided a signal correction method used in a system including a measurement signal generator for generating a measurement signal; a reference signal generator for generating a reference signal; and a signal processing section for processing the measurement signal and the reference signal, the method including the steps of: (a) measuring at a first time the reference signal having been processed by the signal processing section, measuring at a second time the reference signal having been processed by the signal processing section, and thereafter measuring the measurement signal having been processed by the signal processing section; and (b) correcting the measurement signal having been processed by the signal processing section and measured in step (a), based on a change from the reference signal having been processed by the signal processing section and measured at the first time in step (a) to the reference signal having been processed by the signal processing section and measured at the second time in step (a).

Alternatively, there is provided a signal correction method used in a system including a measurement signal generator for generating a measurement signal; and a signal processing section for processing the measurement signal, the method including the steps of: (a) switching between a first state in which the measurement signal is input from the measurement signal generator to the signal processing section and a second state in which the measurement signal is not input from the measurement signal generator to the signal processing section; (b) measuring at a first time a signal output from the signal processing section in the second state as a reference signal, measuring at a second time a signal output from the signal processing section in the second state as the reference signal, and thereafter measuring the measurement signal having been processed by the signal processing section in the first state; and (c) correcting the measurement signal having been processed by the signal processing section and measured in step (b) in the first state, based on a change from the reference signal measured at the first time to the reference signal measured at the second time.

In one embodiment of the invention, the step of correcting the measurement signal having been processed by the signal processing section is performed during the operation of the system.

In another embodiment of the invention, the step of correcting the measurement signal having been processed by the signal processing section is performed immediately after activation of the system, wherein the measurement signal and the reference signal measured are learned immediately before a halt of the system, wherein the measurement signal learned immediately before the halt of the system is used as the measurement signal having been processed by the signal processing section, wherein the reference signal measured by the signal measurement section immediately after activation of the system is used as the reference signal having been processed by the signal processing section and measured at the second time, and wherein the reference signal learned immediately before the halt of the system is used as the reference signal having been processed by the signal processing section and measured at the first time.

According to the present invention, a measurement signal having been processed by a signal processing section and measured by a signal measurement section is corrected based on a change from a reference signal having been processed by the signal processing section and measured at a first time to the reference signal having been processed by the signal processing section and measured at a second time. As a result, it is possible to compensate for any drifting of the output signal from the signal processing section due to environmental condition changes (e.g., temperature changes) around the signal processing section for processing the measurement signal output from a measurement signal generator. Thus, it is possible to accurately transfer the measurement signal output from the measurement signal generator without being influenced by environmental condition changes. This is especially advantageous in a system which is required to detect minute changes in a measurement signal output from a measurement signal generator (e.g., a sensor). Examples of such systems include a system which detects the changes in the output of a current sensor for measuring a current flowing through a motor (for generating a driving force for a vehicle) and a battery.

The correction for the output signal from the signal processing section for processing the measurement signal output from the measurement signal generator may be performed during the operation of a system including that measurement signal generator, or immediately after activation of the system. In the case where the correction is performed immediately after activation of the system, it becomes possible to correct any shift in an apparent zero point of the output of the measurement signal generator that may occur during a halt of the system.

Thus, the invention described herein makes possible the advantage of providing an apparatus and a method for signal correction for correcting an output signal from a signal processing section which processes a measurement signal output from a measurement signal generator (e.g., a sensor), thereby compensating for the drifting of the signal due to environmental condition changes (e.g., temperature changes).

This and other advantages of the present invention will become apparent to those skilled in the art upon reading and understanding the following detailed description with reference to the accompanying figures.

DESCRIPTION OF THE PREFERRED EMBODIMENTS

First, the principles of the present invention will be described.

Figure 1:
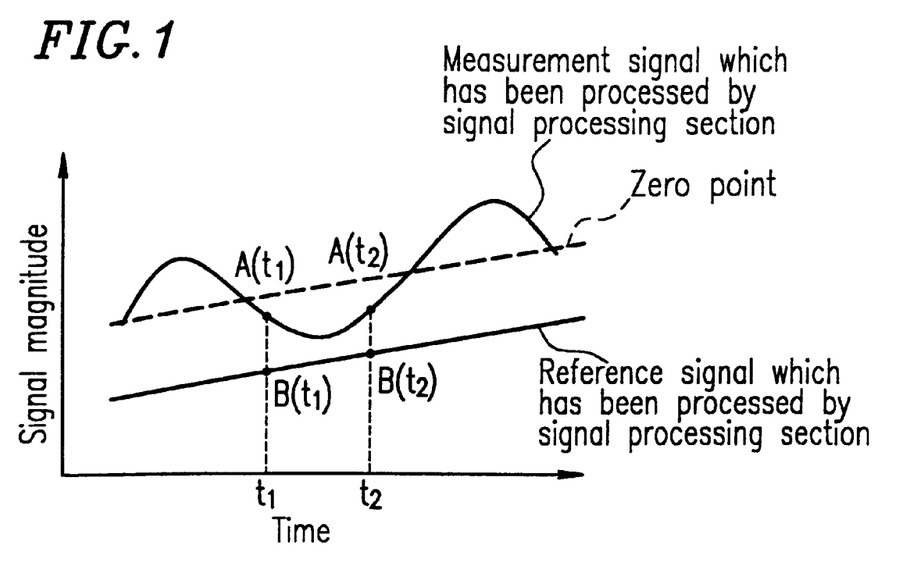
FIG. 1 shows changes in a measurement signal which has been processed by a signal processing section and changes in a reference signal which has been processed by the signal processing section.

FIG. 1 shows changes in a measurement signal which has been processed by a signal processing section and changes in a reference signal which has been processed by the signal processing section. In FIG. 1, the horizontal axis represents time, whereas the vertical axis represents the magnitude of a signal. The measurement signal is generated by a measurement signal generator (e.g., a sensor).

The signal processing section which processes the measurement signal and the reference signal is susceptible to the effects of environmental condition changes (e.g., temperature changes). For example, as shown in FIG. 1, the zero point of the measurement signal which has been processed by the signal processing section, which should ideally be constant, may vary over time. The present invention employs the reference signal for correcting the measurement signal which has been processed by the signal processing section against environmental condition changes. As used herein, the "reference signal" is defined as a signal having a constant value. Since the reference signal is led through the same signal processing section that processes the measurement signal, the reference signal receives substantially the same influence, due to environmental condition changes, as does the measurement signal. According to the present invention, the measurement signal which has been processed by the signal processing section is corrected based on the changes in the reference signal which has been processed by the signal processing section.

Alternatively, it is possible to correct the measurement signal which has been processed by the signal processing section, without even inputting the reference signal to the signal processing section, by comparing an output from the signal processing section obtained in a state where the measurement signal output from the measurement signal generator is input to the signal processing section against an output from the signal processing section obtained in a state where the measurement signal output from the measurement signal generator is not input to the signal processing section.

At each point of time $t_1$ and $t_2$, the measurement signal which has been processed by the signal processing section and the reference signal which has been processed by the signal processing section are measured. The measurement signal $A(t_2)$ which has been processed by the signal processing section and which was measured at time $t_2$ is corrected to $A'(t_2)$ in accordance with eq. 1 (shown below). Such measurement and compensation can be performed by a signal measurement section and a correction section (both of which can be implemented by using e.g., a CPU).

$$A'(t_2)=A(t_2)-\{B(t_2)-B(t_1)\} \qquad \text{eq. 1}$$

In eq. 1, $A(t_2)$ represents a measurement signal which has been processed by the signal processing section and which was measured by the signal measurement section at time $t_2$. $B(t_2)$ represents a reference signal which has been processed by the signal processing section and which was measured by the signal measurement section at time $t_2$. $B(t_1)$ represents the reference signal which has been processed by the signal processing section and which was measured by the signal measurement section at time $t_1$. The symbol "=" indicates that the value on the right side of the symbol is substituted for the value on the left side of the symbol.

Alternatively, the measurement signal which is measured by the signal measurement section at a point in time after $t_2$ may be corrected based on $B(t_1)$ and $B(t_2)$.

Thus, by correcting the output signal from the signal processing section which processes the measurement signal output from the measurement signal generator (i.e., the measurement signal which has been processed by the signal processing section), it is possible to compensate for any drifting of the output signal from the signal processing section due to environmental condition changes (e.g., temperature changes) around the signal processing section for processing the measurement signal output from the measurement signal generator. As a result, it is possible to accurately transfer the measurement signal output from the measurement signal generator without being influenced by environmental condition changes.

In the case where the system including the measurement signal generator comes to a halt between time $t_1$ and time $t_2$, the consistency of the measurement signal output from the measurement signal generator and the consistency of the reference signal may be lost because the zero point of the output from the measurement signal generator may shift during the halt of the system. In such cases, the measurement signal which has been processed by the signal processing section is corrected in accordance with eq. 2 (described below) instead of eq. 1.

Figure 2:
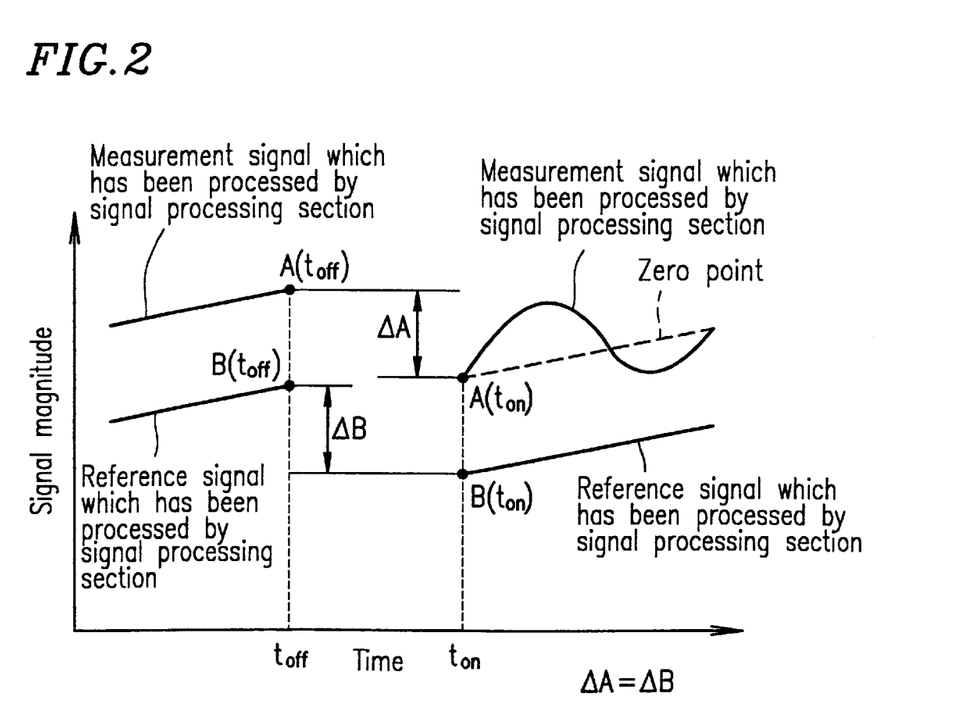
FIG. 2 shows changes in a measurement signal which has been processed by a signal processing section and changes in a reference signal which has been processed by the signal processing section, where the system comes to a halt ($t_{off}$) and thereafter is activated ($t_{on}$).

FIG. 2 shows changes in a measurement signal which has been processed by a signal processing section and changes in a reference signal which has been processed by the signal processing section, where the system comes to a halt ($t_{off}$) and thereafter is activated ($t_{on}$). In the graph of FIG. 2, the horizontal axis represents time, whereas the vertical axis represents the magnitude of a signal.

Immediately before the halt of the system (i.e., at $t_{off}$), the measurement signal which has been processed by the signal processing section and the reference signal which has been processed by the signal processing section are learned. The learned values are stored in a memory such as a RAM. Immediately after the system is activated (i.e., at $t_{on}$), the measurement signal which has been processed by the signal processing section and the reference signal which has been processed by the signal processing section are measured. The measurement signal $A(t_{on})$ which has been processed by the signal processing section and which was measured immediately after the activation of the system (i.e., $t_{on}$) is corrected to $A'(t_{on})$ in accordance with eq. 2 (shown below). This correction is based on the premise that $\Delta A=\Delta B$ as shown in FIG. 2. Such measurement and compensation can be performed by a signal measurement section and a correction section (both of which can be implemented by using e.g., a CPU).

$$A'(t_{on})=A(t_{on})-\{A(t_{off})-\{B(t_{on})-B(t_{off})\}\} \qquad \text{eq. 2}$$

In eq. 2, $A(t_{off})$ represents a measurement signal which has been processed by the signal processing section and which was learned at time $t_{off}$. $B(t_{on})$ represents a reference signal which has been processed by the signal processing section and which was measured by the signal measurement section at time $t_{on}$. $B(t_{off})$ represents the reference signal which has been processed by the signal processing section and which was learned at time $t_{off}$. The symbol "=" indicates that the value on the right side of the symbol is substituted for the value on the left side of the symbol.

By thus correcting the measurement signal which has been processed by the signal processing section immediately after the activation of the system, any shift in the zero point of the output from the measurement signal generator that may occur during the halt of the system can be corrected.

Hereinafter, the present invention will be described by way of illustrative examples, with reference to the accompanying figures.

EXAMPLE 1

Figure 3:
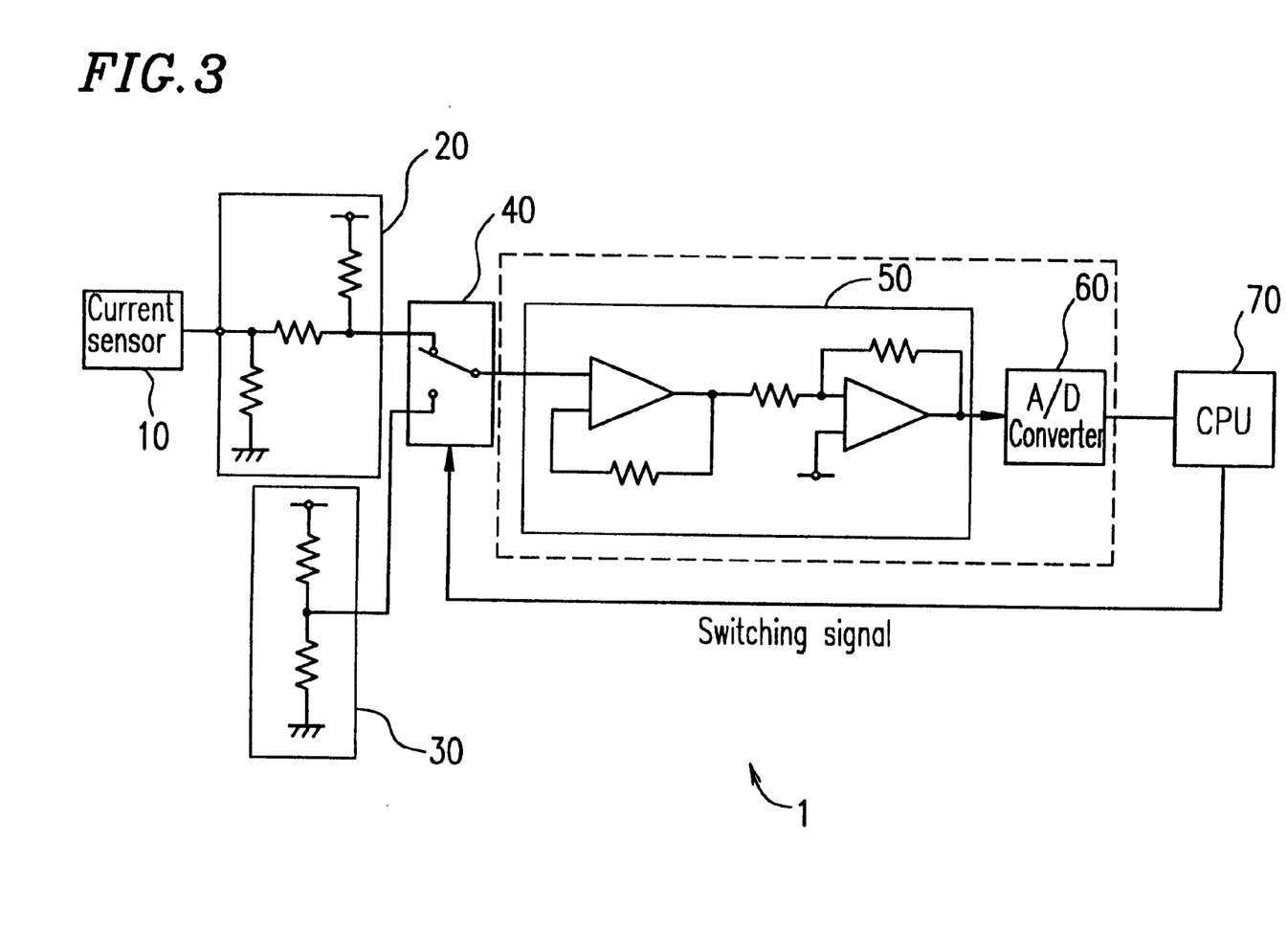
FIG. 3 illustrates the structure of a signal correction apparatus 1 according to Example 1 of the present invention.

FIG. 3 illustrates the structure of a signal correction apparatus 1 according to Example 1 of the present invention. The signal correction apparatus 1 has a function of correcting an output signal from processing circuitry (including a processing circuit 50 and an A/D converter 60) for processing a measurement signal which is output from a current sensor 10 for measuring a current flowing through a motor (not shown) that generates a driving force for a vehicle.

The signal correction apparatus 1 includes: the current sensor 10 and a current-voltage converter 20 (serving as a measurement signal generator); a reference voltage generator 30 (serving as a reference signal generator); a switch 40 (serving as a control section); the processing circuit 50 and the A/D converter 60 (serving as a signal processing section); and a CPU 70 (serving as a signal measurement section and a correction section).

The current-voltage converter 20 converts a current which is output from the current sensor 10 into a voltage. The reference voltage generator 30 generates a reference voltage. The switch 40 selectively outputs either a voltage which is output from the current-voltage converter 20 or a voltage which is output from the reference voltage generator 30. The processing circuit 50 subjects the voltage which is output from the switch 40 to a predetermined process (e.g., voltage gain adjustment and impedance conversion). The A/D converter 60 subjects the output from the processing circuit 50 to an A/D conversion. The CPU 70 corrects the digital value which is output from the A/D converter 60.

The CPU 70 controls the switch 40 by supplying a switching signal to the switch 40. For example, if the switching signal is at a first level (e.g. a HIGH level), the switch 40 is controlled so as to couple the voltage which is output from the current-voltage converter 20 to the processing circuit 50. If the switching signal is at a second level (e.g. a LOW level), the switch 40 is controlled so as to couple the voltage which is output from the reference voltage generator 30 to the processing circuit 50. Usually, the measurement signal which is output from the current sensor 10 is output from the switch 40 in accordance with the switching signal being at the first level (e.g. the HIGH level). As a result of switching the switch 40 at predetermined intervals, the reference signal which is output from the reference voltage generator 30 is output from the switch 40 at predetermined intervals.

A correction for the output signal from the processing circuitry for processing the measurement signal which is output from the current sensor 10 is performed when the vehicle accommodating the current sensor 10 is being driven (i.e., during an ignition-on state), or when the vehicle accommodating the current sensor 10 is activated after a halt state (i.e., during a transition from an ignition-off state to an ignition-on state).

Figure 4:
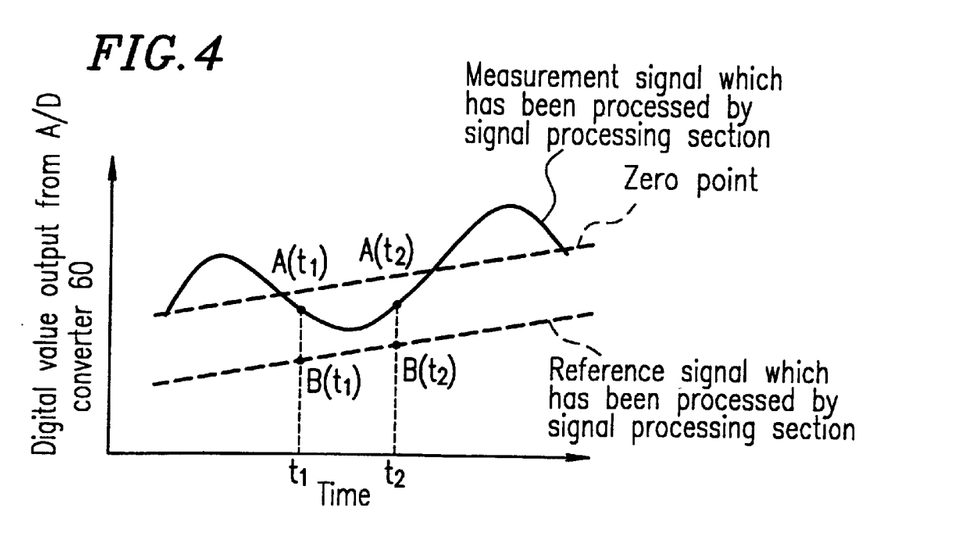
FIG. 4 shows changes in a digital value output from an A/D (analog/digital) converter 60 during an ignition-on state.

FIG. 4 shows changes in a signal (i.e., a digital value output from the A/D converter 60) which is obtained by subjecting the measurement signal output from the current sensor 10 to a processing by the processing circuit 50 and the A/D converter 60, and changes in a signal (i.e., a digital value output from the A/D converter 60) which is obtained by subjecting the reference signal output from the reference voltage generator 30 to a processing by the processing circuit 50 and the A/D converter 60, during an ignition-on state.

The CPU 70 switches the switch 40 so as to measure the signal which is obtained by subjecting the measurement signal output from the current sensor 10 to a processing by the processing circuit 50 and the A/D converter 60, and the signal which is obtained by subjecting the reference signal output from the reference voltage generator 30 to a processing by the processing circuit 50 and the A/D converter 60 at each point of time $t_1$ and time $t_2$. Strictly speaking, the CPU 70 cannot simultaneously measure the signal which is obtained by subjecting the measurement signal (output from the current sensor 10) to the processing by the processing circuit 50 and the A/D converter 60 and the signal which is obtained by subjecting the reference signal (output from the reference voltage generator 30) to the processing by the processing circuit 50 and the A/D converter 60 because these two signals cannot be output simultaneously from the switch 40. However, the switch 40 is switched in a substantially short period of time so that the two signals can be considered as being simultaneously measured.

The CPU 70 corrects the signal which is obtained by subjecting the measurement signal output from the current sensor 10 to the processing by the processing circuit 50 and the A/D converter 60 in accordance with eq. 3:

$$A'(t_2)=A(t_2)-\{B(t_2)-B(t_1)\} \quad \text{eq. 3}$$

In eq. 3, $A(t_2)$ represents a signal which is obtained by subjecting the measurement signal output from the current sensor 10 to the processing by the processing circuit 50 and the A/D converter 60 and measuring the processed signal at time $t_2$. $B(t_2)$ represents a signal which is obtained by subjecting the reference signal to the processing by the processing circuit 50 and the A/D converter 60 and measuring the processed signal at time $t_2$. $B(t_1)$ represents a signal which is obtained by subjecting the reference signal to the processing by the processing circuit 50 and the A/D converter 60 and measuring the processed signal at time $t_1$. The symbol "=" indicates that the value on the right side of the symbol is substituted for the value on the left side of the symbol.

Similarly, the CPU 70 corrects the signal which is obtained by subjecting the measurement signal output from the current sensor 10 to the processing by the processing circuit 50 and the A/D converter 60 in accordance with eq. 4 below. It should be noted that eq. 4 is an extension of eq. 3 which is modified so that it is applicable to any integer k which is equal to or greater than 2.

$$A'(t_k)=A(t_k)-\{B(t_k)-B(t_1)\}(\text{where } 2\leq k) \quad \text{eq. 4}$$

In eq. 4, $A(t_k)$ represents a signal which is obtained by subjecting the measurement signal output from the current sensor 10 to the processing by the processing circuit 50 and the A/D converter 60 and measuring the processed signal at time $t_k$. $B(t_k)$ represents a signal which is obtained by subjecting the reference signal to the processing by the processing circuit 50 and the A/D converter 60 and measuring the processed signal at time $t_k$. $B(t_1)$ represents a signal which is obtained by subjecting the reference signal to the processing by the processing circuit 50 and the A/D converter 60 and measuring the processed signal at time $t_1$. The symbol "=" indicates that the value on the right side of the symbol is substituted for the value on the left side of the symbol.

Alternatively, the CPU 70 may correct the signal which is obtained by processing the measurement signal output from the current sensor 10 in accordance with eq. 5:

$$A'(t_k)=A(t_k)-\{B(t_k)-B(t_{k-1})\}(\text{where } 2\leq k) \quad \text{eq. 5}$$

In eq. 5, $A(t_k)$ represents a signal which is obtained by subjecting the measurement signal output from the current sensor 10 to the processing by the processing circuit 50 and the A/D converter 60 and measuring the processed signal at time $t_k$. $B(t_k)$ represents a signal which is obtained by subjecting the reference signal to the processing by the processing circuit 50 and the A/D converter 60 and measuring the processed signal at time $t_k$. $B(t_{k-1})$ represents a signal which is obtained by subjecting the reference signal to the processing by the processing circuit 50 and the A/D converter 60 and measuring the processed signal at time $t_{k-1}$. The symbol "=" indicates that the value on the right side of the symbol is substituted for the value on the left side of the symbol. In accordance with eq. 5, the signal which is obtained by subjecting the measurement signal output from the current sensor 10 to the processing by the processing circuit 50 and the A/D converter 60 is corrected based on the recent changes in the reference signal.

Alternatively, the CPU 70 may correct the signal which is obtained by processing the measurement signal output from the current sensor 10 in accordance with eq. 4 or eq. 5 for any value of k such that $2\leq k\leq 2n-1$ (where $n\geq 2$), and in accordance with eq. 6 for any value of k such that $2n\leq k$:

$$A'(t_k)=A(t_k)-\{\Sigma_{i=n,\,2n-1}B(t_i)-\Sigma_{i=0,\,n-1}B(t_i)\}/n(\text{where } 2\leq n) \quad \text{eq. 6}$$

In the present specification, the expression "$\Sigma_{i=x,y} B(t_i)$" indicates a sum which is obtained by adding the values of $B(t_i)$ for every integer i in the range of x to y, where each of x and y may be any natural number.

In accordance with eq. 6, the signal which is obtained by subjecting the measurement signal output from the current sensor 10 to the processing by the processing circuit 50 and the A/D converter 60 is corrected based on a mean value obtained within a predetermined period. As a result, a correction with an improved S/N ratio can be attained relative to the correction performed in accordance with eq. 4 or eq. 5, each of which employs instantaneous values.

Alternatively, the CPU 70 may correct the signal which is obtained by processing the measurement signal output from the current sensor 10 in accordance with eq. 4 or eq. 5 for any value of k such that $2 \leq k \leq 2n-1$ (where $n \geq 2$), and in accordance with eq. 7 for any value of k such that $j \cdot n \leq k \leq (J+1) \cdot n - 1$ (where j is an integer equal to or greater than 2):

$$A'(t_k) = A(t_k) - \{\Sigma_{i=(j-1)\cdot n,\ j\cdot n-1} B(t_i) - \Sigma_{i=(j-2)\cdot n,\ (j-1)\cdot n-1} B(t_i)\}/n \text{(where } j\cdot n \leq k \leq (j+1)\cdot n-1) \quad \text{eq. 7}$$

In accordance with eq. 7, the signal which is obtained by subjecting the measurement signal output from the current sensor 10 to the processing by the processing circuit 50 and the A/D converter 60 is corrected based on a recent mean value obtained within a predetermined period. As a result, a more accurate correction can be attained than the correction realized in accordance with eq. 6.

Figure 5:
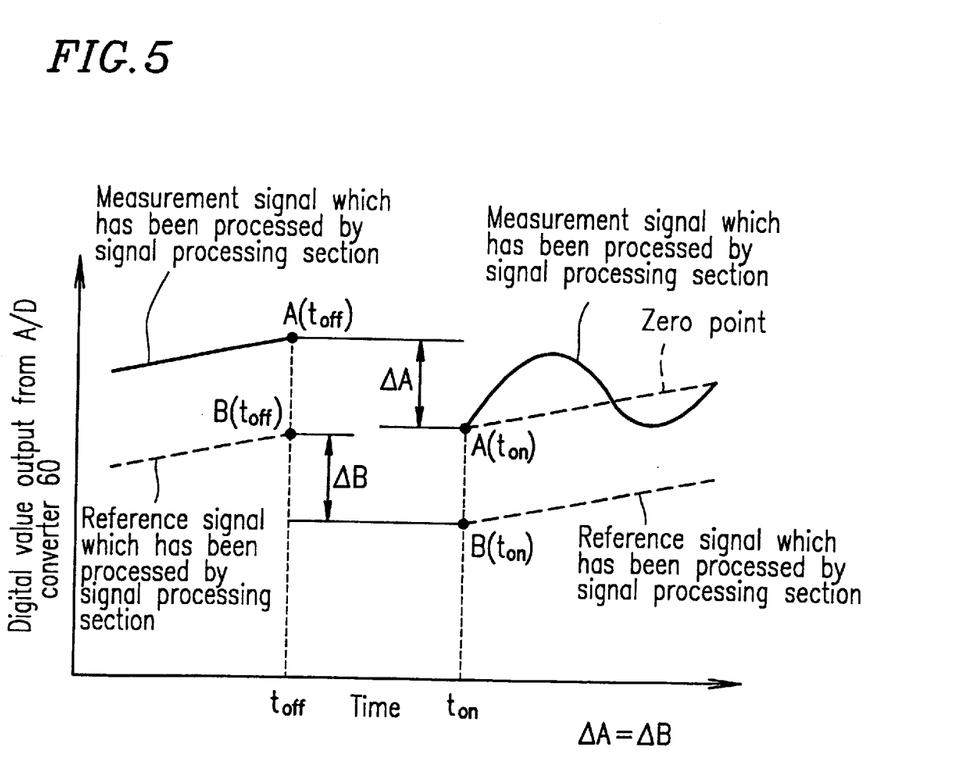
FIG. 5 shows changes in a digital value output from an A/D converter 60 during a transition from an ignition-off state to an ignition-on state.

FIG. 5 shows changes in a signal (i.e., a digital value output from the A/D converter 60) which is obtained by subjecting the measurement signal output from the current sensor 10 to a processing by the processing circuit 50 and the A/D converter 60, and changes in a signal (i.e., a digital value output from the A/D converter 60) which is obtained by subjecting the reference signal output from the reference voltage generator 30 to a processing by the processing circuit 50 and the A/D converter 60, during a transition from an ignition-off state to an ignition-on state.

The CPU 70 switches the switch 40 so as to measure the signal which is obtained by subjecting the measurement signal output from the current sensor 10 to the processing by the processing circuit 50 and the A/D converter 60, and the signal which is obtained by subjecting the reference signal output from the reference voltage generator 30 to the processing by the processing circuit 50 and the A/D converter 60 during an ignition-off state (i.e., at time $t_{off}$). The CPU 70 stores the measured signal value as a learned value in a memory (not shown). The learned value which is stored in the memory may be an instantaneous value at time $t_{off}$, or a mean value obtained within a predetermined period prior to time $t_{off}$.

The CPU 70 measures the signal which is obtained by subjecting the measurement signal output from the current sensor 10 to the processing by the processing circuit 50 and the A/D converter 60, and the signal which is obtained by subjecting the reference signal output from the reference voltage generator 30 to the processing by the processing circuit 50 and the A/D converter 60 upon entering an ignition-on state (i.e., at $t_{on}$). The CPU 70 corrects the signal $A(t_{on})$ which is obtained by subjecting the measurement signal output from the current sensor 10 to the processing by the processing circuit 50 and the A/D converter 60 to $A'(t_{on})$, in accordance with eq. 8:

$$A'(t_{on}) = A(t_{on}) - \{A(t_{off}) - \{B(t_{on}) - B(t_{off})\}\} \quad \text{eq. 8}$$

In eq. 8, $A(t_{off})$ represents a signal which is obtained by subjecting the measurement signal output from the current sensor 10 to the processing by the processing circuit 50 and the A/D converter 60 and measuring the processed signal at time $t_{off}$. $B(t_{on})$ represents a signal which is obtained by subjecting the reference signal to the processing by the processing circuit 50 and the A/D converter 60 and measuring the processed signal at $t_{on}$. $B(t_{off})$ represents a signal which is obtained by subjecting the reference signal to the processing by the processing circuit 50 and the A/D converter 60 and measuring the processed signal at $t_{off}$. The symbol "=" indicates that the value on the right side of the symbol is substituted for the value on the left side of the symbol.

Thus, by correcting a signal which is obtained by subjecting the measurement signal output from the current sensor 10 to the processing by the processing circuit 50 and the A/D converter 60 upon transition from an ignition-off state to an ignition-on state, any shift in the zero point of the output from the current sensor 10 that may occur during halt state of the vehicle accommodating the current sensor 10 can be corrected. As the current sensor 10, a magnetic-balance type sensor is usually employed. For structural reasons, this type of sensors cannot avoid shifts in their zero points caused by the residual flux in the core. Therefore, it is advantageous to perform the zero point correction method according to the present invention to address the drifting of signals due to temperature changes, in addition to the conventional zero point correction method which is performed to address hysteresis characteristics.

In Example 1, it is also possible to employ a sensor which integrates the current -voltage converter 20. In such cases, the current sensor 10 outputs a voltage value which corresponds to the current value measured by the current sensor 10, and this output voltage may be coupled to the switch 40.

EXAMPLE 2

Figure 6:
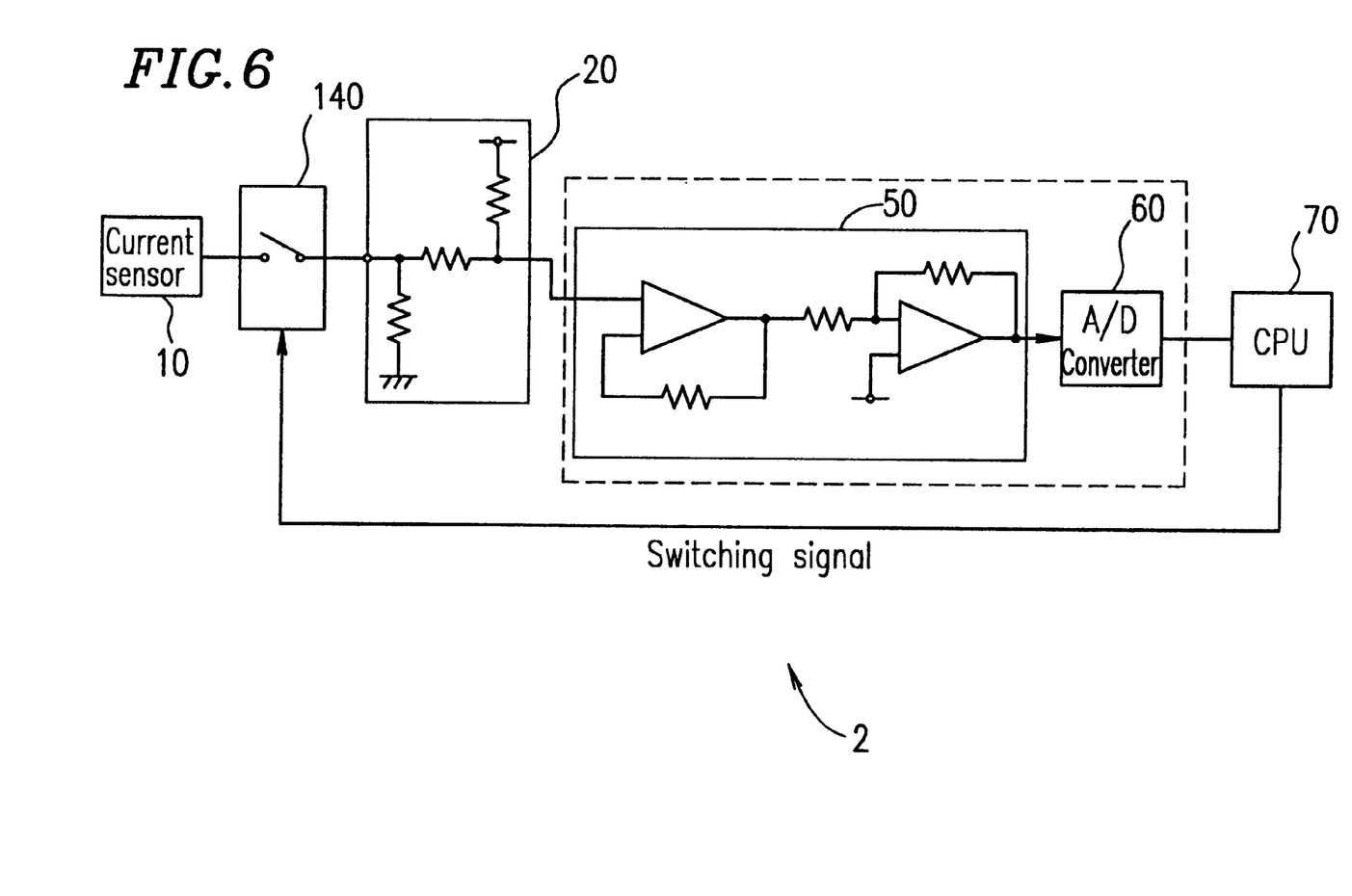
FIG. 6 illustrates the structure of a signal correction apparatus 2 according to Example 2 of the present invention.

FIG. 6 illustrates the structure of a signal correction apparatus 2 according to Example 2 of the present invention. In FIG. 6, component elements which also appear in FIG. 3 are denoted by the same reference numerals as those used therein, and the descriptions thereof are omitted.

The signal correction apparatus 2 includes a switch 140 between the current sensor 10 and the current-voltage converter 20. The switch 140 is controlled by the CPU 70. When the switch 140 is in an on state, the signal which is output from the current sensor 10 is input to the CPU 70 via the current-voltage converter 20, the processing circuit 50, and the A/D converter 60. When the switch 140 is in an off state, the output of the current sensor 10 and the switch 140 are electrically isolated from each other, so that a signal corresponding to the "0" current value is input to the CPU 70 via the current-voltage converter 20, the processing circuit 50, and the A/D converter 60. The signal corresponding to the "0" current value is employed as a reference signal.

Thus, by switching between the on state and the off state of the switch 140, the switching between a state in which the measurement signal is input from the current sensor 10 to the current-voltage converter 20 and a state in which the measure men t signal is not input from the current sensor 10 to the current-voltage converter 20 is controlled.

In accordance with the signal correction apparatus 2, it is possible to correct a signal which is obtained by subjecting the measurement signal output from the current sensor 10 to the processing by the processing circuit 50 and the A/D converter 60 based on the changes in the reference signal, as in Example 1. Furthermore, in accordance with the signal correction apparatus 2, the reference voltage generator 30 (FIG. 3) can be omitted. Thus, the signal correction apparatus 2 is advantageous in that a less complicated structure is required than the structure of the signal correction apparatus 1 (FIG. 3) according to Example 1.

Examples 1 and 2 illustrate applications directed to a current sensor 10 for measuring a current flowing through a subject of measurement (e.g., a motor for generating a driving force for a vehicle). However, the present invention is applicable not only to current sensors, but also to any type of sensor. Therefore, it is intended that the scope of invention, as defined by the attached claims, encompasses signal correction apparatuses and signal correction methods for correcting the output signal from processing circuitry which processes a signal output from any type of sensor.

As described above, according to the present invention, there are provided an apparatus and a method for signal correction for correcting an output signal from a signal processing section which processes a measurement signal output from a measurement signal generator, thereby compensating for the drifting of the signal due to environmental condition changes (e.g., temperature changes).

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A signal correction apparatus comprising:

a measurement signal generator for generating a measurement signal;

a reference signal generator for generating a reference signal;

a signal processing section for processing the measurement signal and the reference signal;

a signal measurement section for measuring at a first time the reference signal having been processed by the signal processing section, measuring at a second time the reference signal having been processed by the signal processing section, and thereafter measuring the measurement signal having been processed by the signal processing section; and a correction section for performing a correction on the measurement signal having been processed by the signal processing section and measured by the signal measurement section, based on a change from the reference signal having been processed by the signal processing section and measured at the first time to the reference signal having been processed by the signal processing section and measured at the second time, wherein the second time is different from the first time.

2. A signal correction apparatus comprising:

a measurement signal generator for generating a measurement signal;

a signal processing section for processing the measurement signal;

a control section for switching between a first state in which the measurement signal is input from the measurement signal generator to the signal processing section and a second state in which the measurement signal is not input from the measurement signal generator to the signal procession section;

a signal measurement section for measuring at a first time a signal output from the signal processing section in the second state as a reference signal, measuring at a second time a signal output from the signal processing section in the second state as the reference signal, and thereafter measuring the measurement signal having been processed by the signal processing section in the first state; and a correction section for performing a correction on the measurement signal having been processed by the signal processing section and measured by the signal measurement section in the first state, based on a change from the reference signal measured at the first time to the reference signal measured at the second time, wherein the second time is different from the first time.

3. A signal correction apparatus according to claim 1, wherein the correction for the measurement signal having been processed by the signal processing section and measured by the signal measurement section is performed during the operation of a system including the measurement signal generator.

4. A signal correction apparatus according to claim 2, wherein the correction for the measurement signal having been processed by the signal processing section and measured by the signal measurement section is performed during the operation of a system including the measurement signal generator.

5. A signal correction apparatus according to claim 1, wherein the correction for the measurement signal having been processed by the signal processing section and measured by the signal measurement section is performed immediately after activation of a system including the measurement signal generator, wherein the measurement signal and the reference signal measured by the signal measurement section are learned immediately before a halt of the system, wherein the measurement signal learned immediately before the halt of the system is used as the measurement signal having been processed by the signal processing section and measured by the signal measurement section, wherein the reference signal measured by the signal measurement section immediately after activation of the system is used as the reference signal having been processed by the signal processing section and measured by the signal measurement section at the second time, and wherein the reference signal learned immediately before the halt of the system is used as the reference signal having been processed by the signal processing section and measured by the signal measurement section at the first time.

6. A signal correction apparatus according to claim 2, wherein the correction for the measurement signal having been processed by the signal processing section and measured by the signal measurement section is performed immediately after activation of a system including the measurement signal generator, wherein the measurement signal and the reference signal measured by the signal measurement section are learned immediately before a halt of the system, wherein the measurement signal learned immediately before the halt of the system is used as the measurement signal having been processed by the signal processing section and measured by the signal measurement section, wherein the reference signal measured by the signal measurement section immediately after activation of the system is used as the reference signal having been processed by the signal processing section and measured by the signal measurement section at the second time, and wherein the reference signal learned immediately before the halt of the system is used as the reference signal having been processed by the signal processing section and measured by the signal measurement section at the first time.

7. A signal correction method used in a system comprising a measurement signal generator for generating a measurement signal; a reference signal generator for generating a reference signal; and a signal processing section for processing the measurement signal and the reference signal, the method comprising the steps of:

(a) measuring at a first time the reference signal having been processed by the signal processing section, measuring at a second time the reference signal having been processed by the signal processing section, and thereafter measuring the measurement signal having been processed by the signal processing section; and (b) correcting the measurement signal having been processed by the signal processing section and measured in step (a), based on a change from the reference signal having been processed by the signal processing section and measured at the first time in step (a) to the reference signal having been processed by the signal processing section and measured at the second time in step (a), wherein the second time is different from the first time.

8. A signal correction method used in a system comprising a measurement signal generator for generating a measurement signal; and a signal processing section for processing the measurement signal, the method comprising the steps of:

(a) switching between a first state in which the measurement signal is input from the measurement signal generator to the signal processing section and a second state in which the measurement signal is not input from the measurement signal generator to the signal processing section;

(b) measuring at a first time a signal output from the signal processing section in the second state as a reference signal, measuring at a second time a signal output from the signal processing section in the second state as the reference signal, and thereafter measuring the measurement signal having been processed by the signal processing section in the first state; and (c) correcting the measurement signal having been processed by the signal processing section and measured in step (b) in the first state, based on a change from the reference signal measured at the first time to the reference signal measured at the second time, wherein the second time is different from the first time.

9. A signal correction method according to claim 7, wherein the step of correcting the measurement signal having been processed by the signal processing section is performed during the operation of the system.

10. A signal correction method according to claim 8, wherein the step of correcting the measurement signal having been processed by the signal processing section is performed during the operation of the system.

11. A signal correction method according to claim 7, wherein the step of correcting the measurement signal having been processed by the signal processing section is performed immediately after activation of the system, wherein the measurement signal and the reference signal measured are learned immediately before a halt of the system, wherein the measurement signal learned immediately before the halt of the system is used as the measurement signal having been processed by the signal processing section, wherein the reference signal measured by the signal measurement section immediately after activation of the system is used as the reference signal having been processed by the signal processing section and measured at the second time, and wherein the reference signal learned immediately before the halt of the system is used as the reference signal having been processed by the signal processing section and measured at the first time.

12. A signal correction method according to claim 8, wherein the step of correcting the measurement signal having been processed by the signal processing section is performed immediately after activation of the system, wherein the measurement signal and the reference signal measured are learned immediately before a halt of the system, wherein the measurement signal learned immediately before the halt of the system is used as the measurement signal having been processed by the signal processing section, wherein the reference signal measured by the signal measurement section immediately after activation of the system is used as the reference signal having been processed by the signal processing section and measured at the second time, and wherein the reference signal learned immediately before the halt of the system is used as the reference signal having been processed by the signal processing section and measured at the first time.

* * * * *

UNITED STATES PATENT AND TRADEMARK OFFICE
CERTIFICATE OF CORRECTION

PATENT NO.    : 6,369,584 B1
DATED         : April 9, 2002
INVENTOR(S)   : Naohisa Morimoto et al.

It is certified that error appears in the above-identified patent and that said Letters Patent is hereby corrected as shown below:

Title page,
Item [56], References Cited, please add; --
    -- OTHER PUBLICATIONS
European Search Report dated July 13, 2000 for EP 00 10 7940 --

Signed and Sealed this

Fourth Day of May, 2004

JON W. DUDAS
*Acting Director of the United States Patent and Trademark Office*